US007454020B2

(12) United States Patent
Herz et al.

(10) Patent No.: US 7,454,020 B2
(45) Date of Patent: Nov. 18, 2008

(54) SYSTEM AND METHOD FOR ENCRYPTING DATA IN PICTORIAL DATA

(76) Inventors: Frederick S. M. Herz, 2169 Crestwald Ter., Warrington, PA (US) 18976; Yael Gertner, 1512 Country Lake Dr., Champaign, IL (US) 61821; Craig Martell, 294 Paseo Gularte, San Juan Bautista, CA (US) 95045; Sampath Kannan, 1107 Spruce St., Philadelphia, PA (US) 19107

( * ) Notice: Subject to any disclaimer, the term of this patent is extended or adjusted under 35 U.S.C. 154(b) by 593 days.

(21) Appl. No.: 10/421,609

(22) Filed: Apr. 22, 2003

(65) Prior Publication Data

US 2006/0013390 A1 Jan. 19, 2006

(51) Int. Cl.

| | |
|---|---|
| ***H04K 1/00*** | (2006.01) |
| ***H04L 9/00*** | (2006.01) |
| ***G06K 9/00*** | (2006.01) |
| ***G06K 9/36*** | (2006.01) |
| ***G06K 9/46*** | (2006.01) |
| *G06K 9/48* | (2006.01) |
| *G06F 11/30* | (2006.01) |
| *G06F 12/14* | (2006.01) |

(52) U.S. Cl. ....................... 380/255; 380/281; 380/279; 380/278; 380/259; 380/282; 713/176; 382/100; 382/251; 382/239; 382/248

(58) Field of Classification Search ................. 380/255, 380/278–282, 259; 713/176; 382/100, 251, 382/239, 248
See application file for complete search history.

(56) References Cited

U.S. PATENT DOCUMENTS

| | | | | |
|---|---|---|---|---|
| 6,011,849 | A * | 1/2000 | Orrin | 380/42 |
| 6,768,980 | B1 * | 7/2004 | Meyer et al. | 704/500 |
| 6,961,441 | B1 * | 11/2005 | Hershey et al. | 382/100 |
| 6,996,236 | B1 * | 2/2006 | England et al. | 380/213 |
| 7,039,192 | B1 * | 5/2006 | Whelan | 380/281 |
| 7,209,571 | B2 * | 4/2007 | Davis et al. | 382/100 |
| 2005/0058318 | A1 * | 3/2005 | Rhoads | 382/100 |

FOREIGN PATENT DOCUMENTS

| | | | | |
|---|---|---|---|---|
| JP | 2001251498 | * | 9/2001 | 380/255 |

* cited by examiner

*Primary Examiner*—Ayaz Sheikh
*Assistant Examiner*—Shin-Hon Chen
(74) *Attorney, Agent, or Firm*—Woodcock Washburn LLP

(57) ABSTRACT

An encryption scheme that uses steganography includes an encryption algorithm that encrypts messages by embedding them in a data stream in such a way that an adversary cannot get information about the messages. Since the embedding is the only computation required, this scheme is optimal in computational efficiency. However, since the size of the data stream is large, this scheme is most beneficial when the cost of bandwidth is less expensive than the cost of computation. The scheme embeds the message as specified by a pseudo random generator.

19 Claims, 1 Drawing Sheet

SYSTEM AND METHOD FOR ENCRYPTING DATA IN PICTORIAL DATA

FIELD OF THE INVENTION

The presently disclosed system and method relate to the fields of cryptography, steganography and secure communications. In particular, by virtue of the present disclosure a new field called analog cryptography is proposed.

BACKGROUND OF THE INVENTION

Most encryption schemes are based on some computational assumptions. (The only encryption scheme which is not based on any assumption requires the communicating parties to continuously meet and establish a private key.) Some of the assumptions are quite strong and might turn out to be false. For example, the RSA encryption scheme is based on the assumption that factoring large composite numbers is computationally infeasible in a reasonable amount of time. However, it has been shown that using quantum computers it is possible to factor, making this assumption false with regard to quantum computers. Recently, with the advancement in quantum computation technology, the threat to encryption schemes based on the hardness of factoring assumption increases. Therefore, it is of interest to base encryption schemes on the weakest assumption possible.

Another important feature in encryption schemes is their computational efficiency. Even the most practical encryption schemes usually are quite costly and require at least one exponentiation. In the scheme presented here, the computation is reduced to the minimum. The only computation required in order to create the ciphertext is embedding the bits of the message in a larger data stream. This increased efficiency is achieved by utilizing bandwidth. In particular, to encrypt the message it is embedded into a larger data stream in such a way that an adversary cannot find the embedded message. This is particularly beneficial when the cost of bandwidth is less expensive relative to the cost of computation.

SUMMARY OF THE INVENTION

An encryption scheme that is optimal in its computational efficiency utilizes bandwidth as a resource. This scheme uses steganography in a novel way enabling a weaker than ordinary computational assumption to be used.

The invention includes a system and method of encrypting message data within a data stream for transmission of the encrypted message data from a sender to a receiver. The sender and receiver first establish an initial secret key containing information about how the data message is to be embedded in the data stream for transmission and a seed for a pseudo-random generator that specifies where in the data stream bits of the data message should be embedded. A data stream is selected with desired randomness characteristics, and bits of the message data are pseudo-randomly embedded within the data stream.

In an exemplary embodiment, the data stream includes color picture data that may be obtained by scanning color pictures or by acquiring color picture data from a digital camera. Bits of the message data are then embedded within a randomly selected one of several data streams representing a visual image. Preferably, a color picture is selected that has a large variability in color.

The message data may be embedded within some low order bits of the data stream as determined by output of the pseudo-random generator or, in another example, the data stream may comprise pictorial data including images of persons' faces whereby the secret key specifies which facial expression or expressions of a person is/are to be used to encode the data message. The data stream also may be in an analog format and be noisy so that the embedded data is very difficult to distinguish from the noise.

BRIEF DESCRIPTION OF THE DRAWINGS

The accompanying drawings, which are incorporated in and constitute a part of this specification, illustrate an embodiment of the invention and, together with the detailed description, explain the invention to those skilled in the art. In the drawings.

DETAILED DESCRIPTION OF ILLUSTRATIVE EMBODIMENTS

The encryption scheme implemented by the invention uses steganography in a novel way. Usually, steganography is the art and science of embedding a message in data so that an adversary will not be able to tell whether the data has a message embedded in it or not. Typically, a user will use data available from an outside source to embed the message. Therefore, the user will not have the privilege to choose the type of data used. For example, a worker in an office might want to send personal notes to another worker embedding the messages in the data files already distributed at the work place.

The encryption scheme of the invention uses steganography—embedding a message in data—in a novel way, as encryption. Therefore, unlike other steganographic schemes, it is not relevant to the scheme of the invention whether the adversary will be able to detect the existence of a message in the data. In fact, the data is sent only for the purpose of embedding, so all data streams will have messages embedded in them. Moreover, the data in which the message data is embedded in accordance with the scheme of the invention could be created especially for the purpose of embedding messages in it. Therefore, one can choose the data yielding the highest security and efficiency. As in all private key encryption schemes, the message will be embedded in the data so that an adversary who reads the data will not be able to learn information about the message without knowledge of the secret key.

The data chosen to use for embedding the messages is data produced from scanning color pictures, or data produced from color pictures taken on a digital camera. The reason this data is most appropriate for use with the technique of the invention is because in digital data encoding colors there are usually several data streams representing the same visual image. If these data streams representing the same image cannot be distinguished, the message can be embedded in such a stream that is randomly chosen from the set. The invention then exploits the entropy available in such data to communicate specific messages without an eavesdropper being able to figure out what the messages are. Indeed, statistical tests which are typically used to break steganographic schemes do not perform well in breaking data scanned from color pictures. Moreover, since in the scheme of the invention the sender creating the ciphertext can choose which pictures to scan, he can make sure to pick the pictures with the most variability in color which decreases the possibility of finding any statistical patterns in the data.

Figure 1:
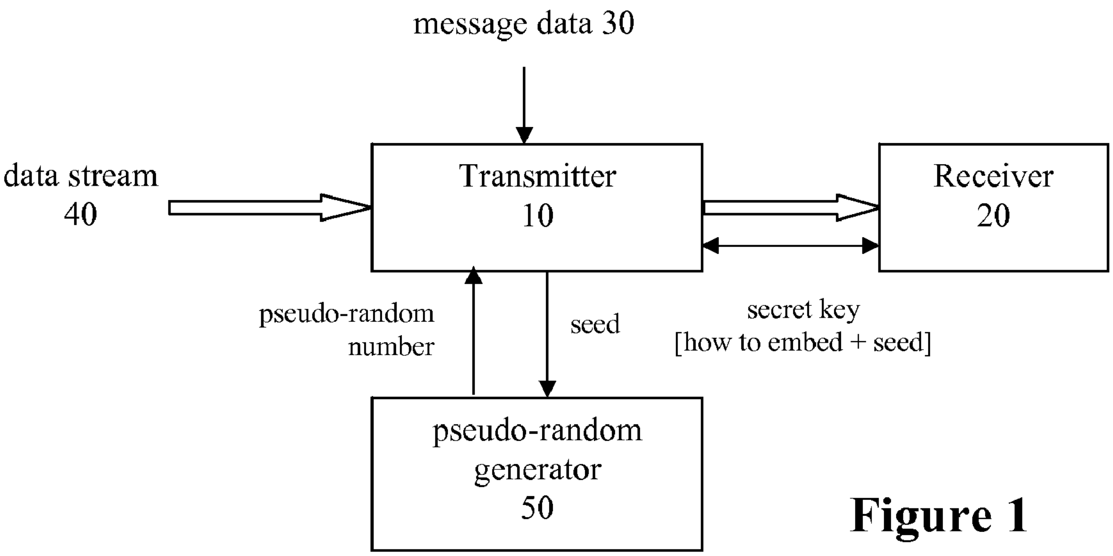
FIG. 1 illustrates a system that encrypts message data within a data stream in accordance with the invention.
Figure 2:
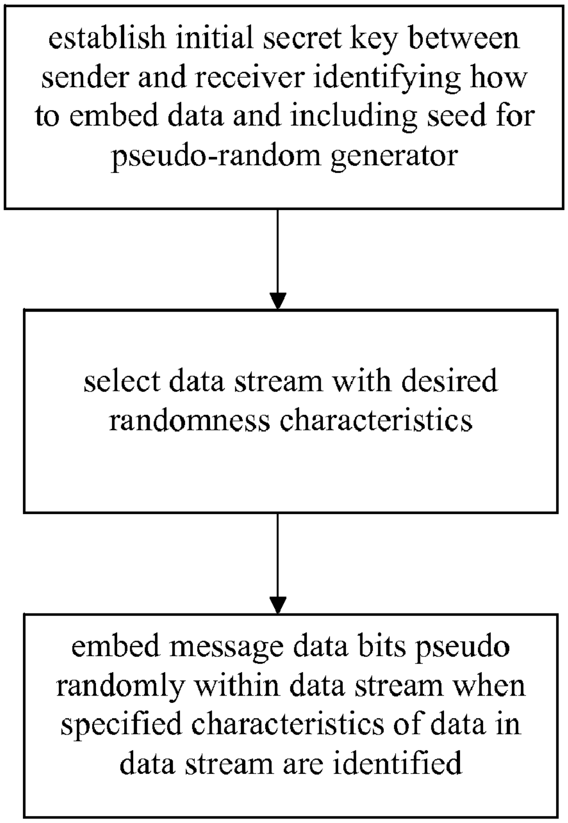
FIG. 2 illustrates an exemplary method for encrypting message data within a data stream in accordance with the invention.

The scheme works according to the following steps. As shown in FIG. 1, the sender and receiver establish an initial secret key between transmitter 10 and receiver 20, respectively. The secret key will contain the information of how the message data 30 is embedded in the data stream 40. In addition, it will contain a seed for a pseudo random generator 50 which will specify where in the data stream 40 the message data bits should be embedded by transmitter 10 for transmission to receiver 20. This method is illustrated in FIG. 2.

Details of Embedding Methods:

There are several ways to embed a message into data. One good way is to embed it is in the low order bits of the data. The size of the message will be small relative to the data. Therefore, not all the low order bits will have messages embedded in them and only a small fraction of them will. This again reduces the possibility of performing statistical attacks on the data, since most statistical attacks succeed only when a large fraction of the bits are used for embedding. In order to decide where in the data to embed the bits a weak pseudo random generator may be used.

Another method of embedding the messages in pictorial data is to embed the message into the picture itself. For example, it is possible that the domain of pictures will depict people with some facial expressions. The secret key will specify which facial expression is the one which will encode the message as well as where to find the pictographic image bearing this encoded message. One possibility is an expression such as satisfaction. Thus, in order to encode the bit zero the picture will denote satisfied people and to encode one it will depict an expression of lack of satisfaction. Since bandwidth is not of concern these pictures can be mixed with other pictures which depict other facial expressions so that an adversary will not be able to guess what the key is. It may be useful in a variation of this idea to use other images of people containing the same expression features as the one bearing the encoded data. (Again realizing bandwidth is not a limiting factor). In this variation, the facial expressions used to encode the messages are satisfaction, drowsiness and possibly other appropriately compatible facial gestures. It would be possible in the previously encoded message to transmit through one or more of the gestures the location data (such as which specific image in a sequence or the coordinates of) the image bearing the encoded message. It would be possible in this scenario to include noise, which is indistinguishable from real data. This noise could consist of other apparently identical satisfied people where the satisfaction feature is used to send encoded messages that determine which people among those that are satisfied actually possess legitimate versus illegitimate (decoy) encoded messages which as a result make the system extremely noisy and random to a would-be attacker. The satisfaction and drowsiness features on other images could, for example, contain the actual encoded message. Thus, it may be possible in this scheme to leverage the use of available bandwidth to add a significantly large amount of randomness in this way (by obfuscating the true message bearing image segments using this type of random noise). In addition, the adversary will not be able to run any statistical test on the data since currently artificial intelligence is not yet capable of detecting facial expressions as well as people can.

Details of Pseudo Random Generator:

Let the data stream have w words in it, $s_0, s_1, \ldots s_{w-1}$ (w is large enough as described later but small enough so that it is within the processing capability of the sender and receiver). For example, a word in the stream can be the digital representation of a scanned picture. The initial seed that the two parties share in their secret key is of length c log w, for some constant c such that $w^c$ is not feasibly long (as described below). This seed is viewed as partitioned into c equal length blocks of length log w each $-K=K_0\ K_1 \ldots K_{c-1}$. This seed specifies where the message is to be embedded in the sequence of words in the data stream. When the $i^{th}$ message is to be sent it is placed in the following location in the word:

$$\left(\sum_{j=0}^{c-1} k_j i^j\right) \bmod w.$$

Someone who does not know the key K will have to essentially guess each of $w^e$ possible keys and try them all to see which one holds the new secret key. Exponent c is chosen so that this computation is not feasible for practical purposes.

This is a much weaker pseudo random generator than the one that is obtained from one way function assumption. The reason a much weaker assumption may be relied upon is because the data itself has some randomness. The scheme is computationally secure in the following sense. If D is the length of the data stream, O(D) is considered to be feasible computation whereas O(D 2) is considered to be infeasible.

Alternative Embodiment for Analog Steganographic Embedding of Messages

In an alternative embodiment it may be possible to devise a similar scheme to that proposed, however, it would be a further objective to utilize the inexpensive costs of bandwidth in order to add a high degree of statistical noise. In this regard, it would be an additional objective to prevent the adversary from being able to detect the presence of an embedded message. In this approach, two primary assumptions are relied upon:

1. That the ability of computational means employing AI techniques to discover the presence of analog data within otherwise very noisy analog content is inferior to that of a human.

2. That one can exploit a sufficiently abundant degree of bandwidth needed to ensure that another human (adversary) will not be capable of scanning the volume of analog contents that may contain the analog message.

In one final variation of this idea, one may seek to leverage the inherent noisiness of the analog data in which the analog encoded messages are embedded in order to not only hide the locations or where analog encoded messages are hidden but further so doing to make it possible for analog encoding of these messages to be performed in an automated fashion. For example, one could easily imagine pictographic or videographic contents in which there are so many unusual or anomalous analog features or actions that the inherent noisiness would make it difficult to detect which, if any, analog feature(s) contained an encoded message. In this example, this inherent noisiness could be further exploited so as to nearly maximally increase entropy to the point that any statistical patterns which could be detected by an adversary would possess such a low degree of statistical confidence as to make the data of little value. This objective can be achieved by maximally spreading around among a maximally large number and diversity the selection and type of analog components containing a given encoded message.

Additional Considerations

1. Co-pending patent application entitled "A Multi-User Secure System Utilizing Shared Keys", by the same authors as the present patent application includes under "Detailed Description" a section describing with a high level of detail how a preferred analog cryptographic scheme that is well suited for the application it is used for, i.e., for purposes of key replenishment of shared set keys. It is, however, obvious that such a scheme could be usable within a much more broad-based context as well as being very similar to the methods as herein described. Therefore in order to further elucidate these methods as presently claimed the inventors hereby incorporate by reference co-pending patent application Ser. No. 10/418,983 entitled, "A Multi-User Secure System Utilizing Shared Keys". Conversely, it can be amply appreciated that the methods for analog encrypted data transmission and delivery (as they are presently herein suggested to apply to all kinds of data) would constitute viable alternative key replenishment methodologies (among still others) to the preferred embodiment as disclosed in the above referenced patent application.

2. The present scheme is applicable to any/all kinds of data. However, in the future it is anticipated for a variety of reasons that the relative computational costs of encryption will increase (while as suggested bandwidth costs will increasingly diminish by comparison). This suggests the increasing potential need for high bandwidth, low computational cost encryption and particularly a type of encryption that incorporates forms of complexity that do not evenly scale with increases in processing speed (as is the case with standard factor-based public key encryption).

3. Quantum Cryptography—As quantum cryptography becomes a practical reality for photonic-based transmissions a need will also arise for fast, efficient yet highly secure encryption methods through which the encryption keys can be securely transmitted in advance of transmission. Once the keys are present (and the fact of their non-interception securely verified) it will be important for the sake of computational efficiency and speed for the scheme to enable the recipient to easily decrypt the message. In addition, once quantum cryptoanalysis becomes a practical realization the use of fundamentally alternative methods such as the analog encryption scheme herein proposed (versus digital factor-based ciphers) will be particularly needed.

CONCLUSION

The scheme proposed here requires less computation than other schemes which use standard pseudo random generators. However, it does rely on the ability to send large amounts of data in an efficient manner. This quite likely is a reasonable assumption since bandwidth is turning out to be inexpensive whereas computation is still costly. In addition, scanning pictures is a task that is easy and inexpensive.

We claim:

1. A method of encrypting message data within a data stream for transmission of the encrypted message data from a sender to a receiver, comprising the steps of:

the sender and receiver establishing an initial secret key containing information about which characteristics of an image within pictorial data in the data stream are to be used to determine a location in the data stream for inserting the message data in the data stream for transmission and containing a seed for a pseudo-random generator;

acquiring a data stream including pictorial data having said image with said characteristics therein and having desired randomness characteristics; and pseudo-randomly embedding bits of the message data within the data stream at the location in the data stream determined based on said image characteristics and an output of a pseudo-random generator that has been seeded by said seed.

2. A method as in claim 1, wherein acquiring the data stream includes the step of acquiring color picture data.

3. A method as in claim 1, wherein acquiring the data stream includes the step of scanning color pictures.

4. A method as in claim 1, wherein acquiring the data stream includes the step of acquiring color picture data from a digital camera.

5. A method as in claim 1, wherein the pseudo-randomly embedding step comprises the step of embedding the bits of the message data within a randomly selected one of several data streams representing a visual image.

6. A method as in claim 1, wherein acquiring the data stream includes the step of selecting a color picture with a large variability in color for use as said data stream.

7. A method as in claim 1, wherein the message data is embedded within some low order bits of the data stream as determined by said output of said pseudo-random generator.

8. A method as in claim 1, wherein the pictorial data includes images of persons' faces and the secret key specifies which facial expression or expressions of a person in an image as said characteristics of the image that are to be used to determine said location in the data stream for inserting the message data.

9. A method as in claim 1, wherein the data stream is in an analog format and is noisy.

10. A method as in claim 1, wherein the pseudo-randomly embedding step comprises the step of embedding in the data stream said seed for said pseudo-random generator that specifies where in the data stream bits of the message data should be embedded.

11. A method as in claim 1, wherein acquiring the data stream includes the step of scanning the data stream to identify images having said characteristics for determining the location in the data stream.

12. A system that encrypts message data within a data stream including pictorial data having images therein and having desired randomness characteristics for transmission of the encrypted message data from a sender to a receiver, comprising:

a pseudo-random generator that specifies where in the data stream bits of the message data should be embedded; and a transmitter that communicates with a receiver to establish an initial secret key containing information about which characteristics of said images within said pictorial data in the data stream are to be used to determine a location in the data stream for inserting the message data in the data stream for transmission and containing a seed for the pseudo-random generator, and that uses an output of the pseudo-random generator upon seeding with said seed and the location in the data stream determined based on said image characteristics to determine where to pseudo-randomly embed bits of the message data within the data stream.

13. A system as in claim 12, wherein the data stream includes color picture data.

14. A system as in claim 13, wherein the transmitter embeds the bits of the message data within a randomly selected one of several data streams representing a visual image including the color picture data.

15. A system as in claim 13, wherein the color picture data has a large variability in color.

16. A system as in claim 13, wherein the color picture data comprises pictorial data including images of persons' faces and the secret key specifies which facial expression or expressions of a person in an image as said characteristics of the image that are to be used by the transmitter to determine a location in the data stream for inserting the message data in the data stream for transmission.

17. A system as in claim 12, wherein the transmitter embeds the message data within some low order bits of the data stream as determined by said output of the pseudo-random generator.

18. A system as in claim 12, wherein the data stream is in an analog format and is noisy.

19. A system as in claim 12, further comprising means for scanning the data stream to identify images having said characteristics for determining the location in the data stream and for providing said images to said transmitter.

* * * * *

UNITED STATES PATENT AND TRADEMARK OFFICE

CERTIFICATE OF CORRECTION

PATENT NO. : 7,454,020 B2
APPLICATION NO. : 10/421609
DATED : November 18, 2008
INVENTOR(S) : Frederick S. M. Herz et al.

It is certified that error appears in the above-identified patent and that said Letters Patent is hereby corrected as shown below:

Title Page

Insert

--Related U.S. Application Data
(60) Provisional application No. 60/373,830, filed on April 22, 2002.--

Column 1, immediately following the title, insert

--CROSS REFERENCE TO RELATED APPLICATION
This application claims the benefit under 35 U.S.C. § 119(e) of U.S. Provisional Application No. 60/373,830, filed April 22, 2002.--

Signed and Sealed this
Tenth Day of July, 2012

David J. Kappos
*Director of the United States Patent and Trademark Office*